Dec. 24, 1946.  W. C. COX  2,413,099
ANTIFRICTION DRIVEWHEEL
Filed Aug. 21, 1944

INVENTOR.
WALTER C. COX
BY
Martin E. Anderson

Patented Dec. 24, 1946

2,413,099

UNITED STATES PATENT OFFICE 2,413,099

ANTIFRICTION DRIVE WHEEL

Walter C. Cox, Denver, Colo.

Application August 21, 1944, Serial No. 550,411

4 Claims. (Cl. 295—10)

This invention relates to improvements in drive-wheel mounts and mechanisms for monorail railways and for trucks.

It is the object of this invention to produce a drivewheel for automotive vehicles of all types which shall be provided with anti-friction bearings of a construction that will produce a free rotation of the parts and in which ball or roller bearings of small dimension can be employed for wheels of any size.

Another object of this invention is to produce an anti-friction mounting of such construction that if one of the anti-friction bearings breaks, another one can be quickly moved into operative position so that there will be no interruption of any considerable period due to such breakage.

Anti-friction bearings of the ball, roller and cone type are well known and these are used almost exclusively in concentric relation with the axis upon which the wheel rotates.

It is one of the objects of this invention to produce a construction in which the balls or rollers rotate about an axis eccentric with respect to the axis of wheel rotation and which cooperate with an annular wheel that contacts the supporting roadway or rail.

A further object of the invention is to produce a construction in which the wheel carries at least two additional sets of anti-friction bearings that can be quickly shifted into operative position in case of breakage.

Having thus briefly described the objects of the invention, the invention itself will now be described in detail and for this purpose reference will be had to the accompanying drawing in which the invention has been illustrated in its preferred embodiment, and in which.

Figure 5:
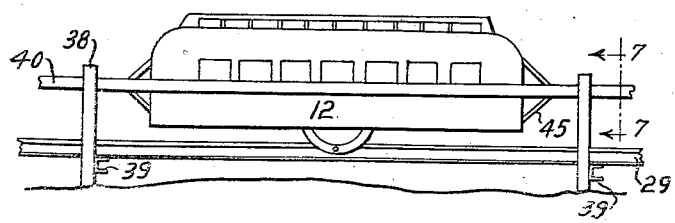
Figure 5 is a side view showing a monorail car to which the invention has been applied.

In the drawing reference numerals 10 and 11 designate brackets that extend downwardly from the car 12 shown in Figure 5 or from any other body to be supported. Positioned in the brackets is a shaft 13; secured to one end of the shaft is a plate 14 that has three openings spaced 120 degrees apart. Plate 14 is held against rotation relative to the shaft by means of a spline 15. A bolt 16 extends through the plate and into the adjacent bearing 10 so as to hold it and the shaft from rotating relative to the bearing. Bolt 16 can be removed and the plate and shaft turned 120 degrees in either direction and latched in that position by bolt.

Secured to the shaft and positioned between the two bearings 10 and 11 is a portion of the wheel which comprises two circular disks, one of which has been designated by reference numeral 17, and the other by reference numeral 18. Disk 17 has a hub 19 against which the inner surface of disk 18 rests. The two disks 17 and 18 are held in assembled relation by means of tap screws 20. The two disks 17 and 18 are provided with openings spaced the same distance from the center of the shaft and 120 degrees apart in a rotary direction. Positioned in these openings are bolts 21. An anti-friction bearing is carried by each of the bolts 21 and consists of an inner ball race 22 and outer ball race 23 and a series of rollers or balls 24. The bolts 21 are so positioned that the peripherial surface of the ball race 23 will project slightly beyond the peripheries of disks 17 and 18. The anti-friction bearings are so positioned with respect to the disk 14 and openings in plate 14 that either one of the three can be moved into position directly beneath the supporting axle. Each of the bolts 21 are provided with nuts 25 that hold the parts in assembled position and which are held against rotation by means of pins or splines 26. The length of the inner ball race 22 is slightly greater than that of the ball race 23 so that the former will be clamped firmly between the two disks while the latter is free to rotate. Surrounding the assembly just described, is an annular wheel or rim 27. In the embodiment shown the rim is provided with a peripherial groove 28 for the reception of the ball portion 29 of a railroad rail. At one side of the rim is an inwardly extending flange 30 that terminates in a hub 31 that has a groove 32 for the reception of a V-type belt 33. Although a belt has been shown an ordinary sprocket chain and sprockets or a gear transmission can be substituted. The inwardly extending flange has an annular shoulder 34 that engages the outer surface of ring 17 adjacent its periphery. Secured to the other side of the rim 27 is a ring 35 that laps the outer edge of disk 18 and this ring is held in place by means of bolts 36. It will now be seen that the rim is held against transverse movement by the coaction of the annular surface 34 and the ring 35.

From the above description, taken in connection with the drawing, it will be apparent that rim 27 can rotate freely about the assembly comprising disk 17, 18 and the three anti-friction bearings. Since the assembly comprising the disks 17 and 19 is held against rotation and latched in such a position that one of the anti-friction bearings is directly beneath the supporting axle, the weight of the load will rest entirely on this anti-friction bearing and permit the ring to rotate freely. Since there is no portion of the load resting directly on the two anti-friction bearings positioned above the axis of the shaft these bearings form idlers and serve as spares that can be rotated into the lowermost position in case the supporting bearing breaks.

The bottom of the groove in the rim may have a covering of rubberized material like that indicated by reference numeral 37.

Figure 7:
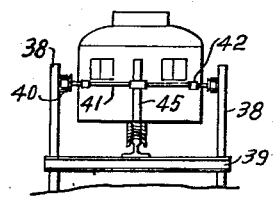
Figure 7 is a section to an enlarged scale taken on line 7—7, Figure 5.
Figure 6:
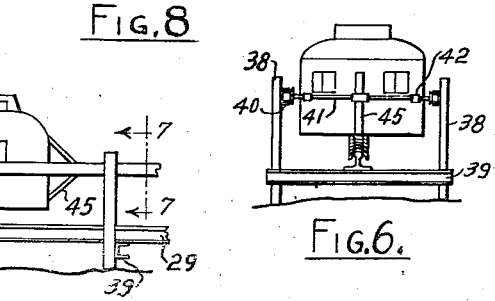
Figure 6 is a view looking in the direction of arrow 6, in Figure 5.

In Figures 5 and 6 the invention has been shown as applied to a monorail car like that designated by reference numeral 12. It will be observed that this railway construction comprises a number of spaced posts or uprights 38 arranged in pairs. A channel 39 connects each pair and supported on this channel is a rail 29. Secured to the inner surfaces of the uprights 38 are channels 40 arranged with the channels facing inwardly. At least one end of the car is provided with a transversely extending shaft 41 that is mounted in bearings 42. The ends of the shaft are provided with rollers 43 that extend into the channel and occupy a position somewhat like that shown in Figure 7. Rollers 43 have flanges 44 that serve to resist lateral movements and which guide the car around curves. Braces 45 resist vertical forces.

Figure 1:
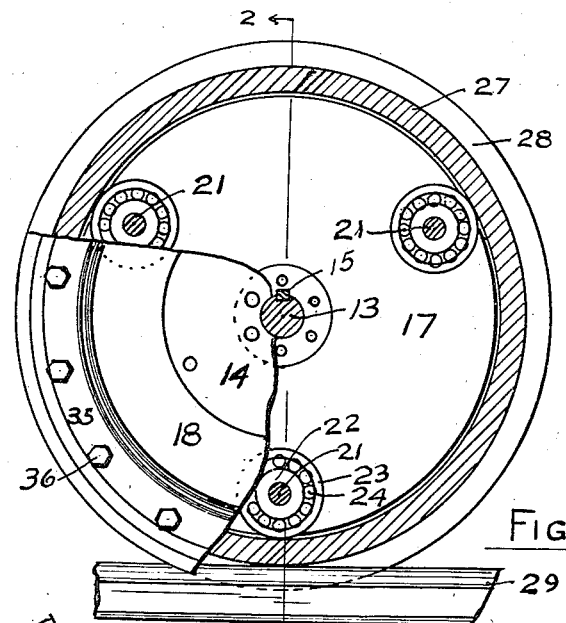
Figure 1 is a side elevation of a combined drive and supporting wheel constructed in accordance with this invention.
Figure 2:
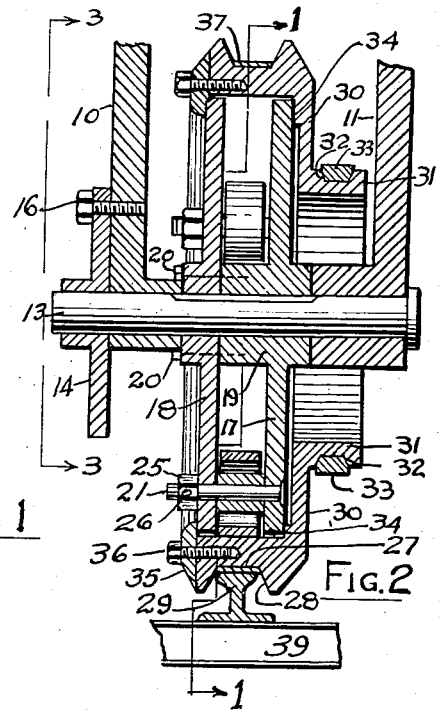
Figure 2 is a diametrical section taken on line 2—2, Figure 1.
Figure 3:
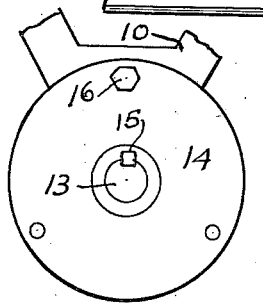
Figure 3 is a side elevation of a portion of the structure looking through plane 3—3, Figure 2.
Figure 4:
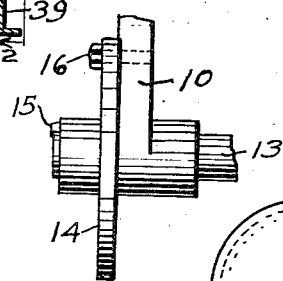
Figure 4 is a side elevation of the part shown in Figure 3.
Figure 8:
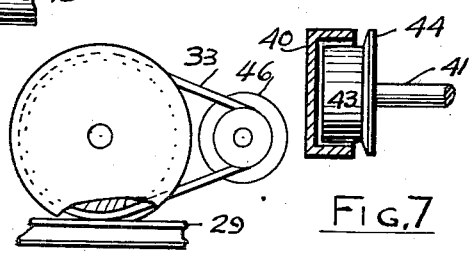
Figure 8 is a diagrammatic representation of a truck wheel with a belt drive.

Although the invention has been illustrated in connection with a monorail railway, it is to be understood that it can be employed in any other relationship where the drivewheel that forms the subject of this invention can be utilized.

Where the wheel is employed in connection with light cars, for example, hand cars such as used in connection with railway maintenance work, the belt can be positioned in the groove 27 between the wheel and the rail in the manner shown in Figure 8. This simplifies the construction and makes a very effective drive, because the weight of the car rests on the belt and this arrangement positively prevents slipping. Where the wheel is to be used on ordinary highways, the groove 27 can be provided with a solid rubber tire that engages the surface of the highway.

In the drawing hub 19, flange 17 and disk 18 form a unitary assembly that serves as a journal for wheel 20; this assembly has been designated by the word "hub" in the appended claims.

Having described my invention what is claimed as new is:

1. A wheel comprising, in combination, a nonrotatable circular hub, an annular wheel rim encircling the hub, three roller bearings carried by the hub and spaced 120 degrees apart, means for latching the hub in any one of three rotary positions in each of which one of the roller bearings is positioned directly beneath the center of the hub, the annular rim encircling the hub and roller bearings, and means for resisting forces tending to move the rim relative to the hub in an axial direction.

2. A wheel comprising, in combination, a nonrotatable circular hub, an annular wheel rim encircling the hub, at least three anti-friction bearings connected with the hub in equiangularly spaced relation, each bearing comprising an inner race nonrotatably connected with the hub at a point directly beneath the center thereof, an annular outer race spaced from the inner race by rollers, the peripherial surface of the outer race extending beyond the peripherial surface of the hub for engagement with the inner surface of the rim, means for resisting forces tending to move the rim relative to the hub in an axial direction and means for latching the hub in as many rotary positions as there are bearings, whereby any one of the bearings may be operatively positioned directly beneath the center of the hub.

3. A supporting device for a car body comprising two spaced brackets secured to the body and extending downwardly therefrom, a shaft extending between and rotatably connected with the brackets, a circular hub nonrotatably connected with the shaft, at least three anti-friction bearings carried by the hub arranged in a circle concentric with the shaft and in equiangularly spaced relation, the peripheries of the outer surfaces of the bearings extending beyond the periphery of the hub, an annular wheel rim encircling the hub and the bearings, means for rotatably connecting the hub and rim in coplanar relation, and means for effecting an angular rotarial adjustment of the hub to bring any one of the bearings into position directly beneath the center of the hub.

4. An automotive vehicle wheel comprising a hub having a shaft nonrotatably connected therewith, a pair of spaced brackets secured to the vehicle and extending downwardly therefrom, the shaft extending between and rotatably connected with the brackets, at least three anti-friction bearings carried by the hub in equiangularly spaced positions, an annular wheel rim encircling the hub and bearings, means for holding the hub and rim in coplanar relation while permitting free relative rotation, and means for latching the shaft in as many relative rotary positions as there are bearings, whereby any one of the bearings can be brought into operative position.

WALTER C. COX.